No. 689,767. Patented Dec. 24, 1901.
S. WARE & J. T. TRENT.
SLIDING GATE.
(Application filed Oct. 22, 1901.)
(No Model.)
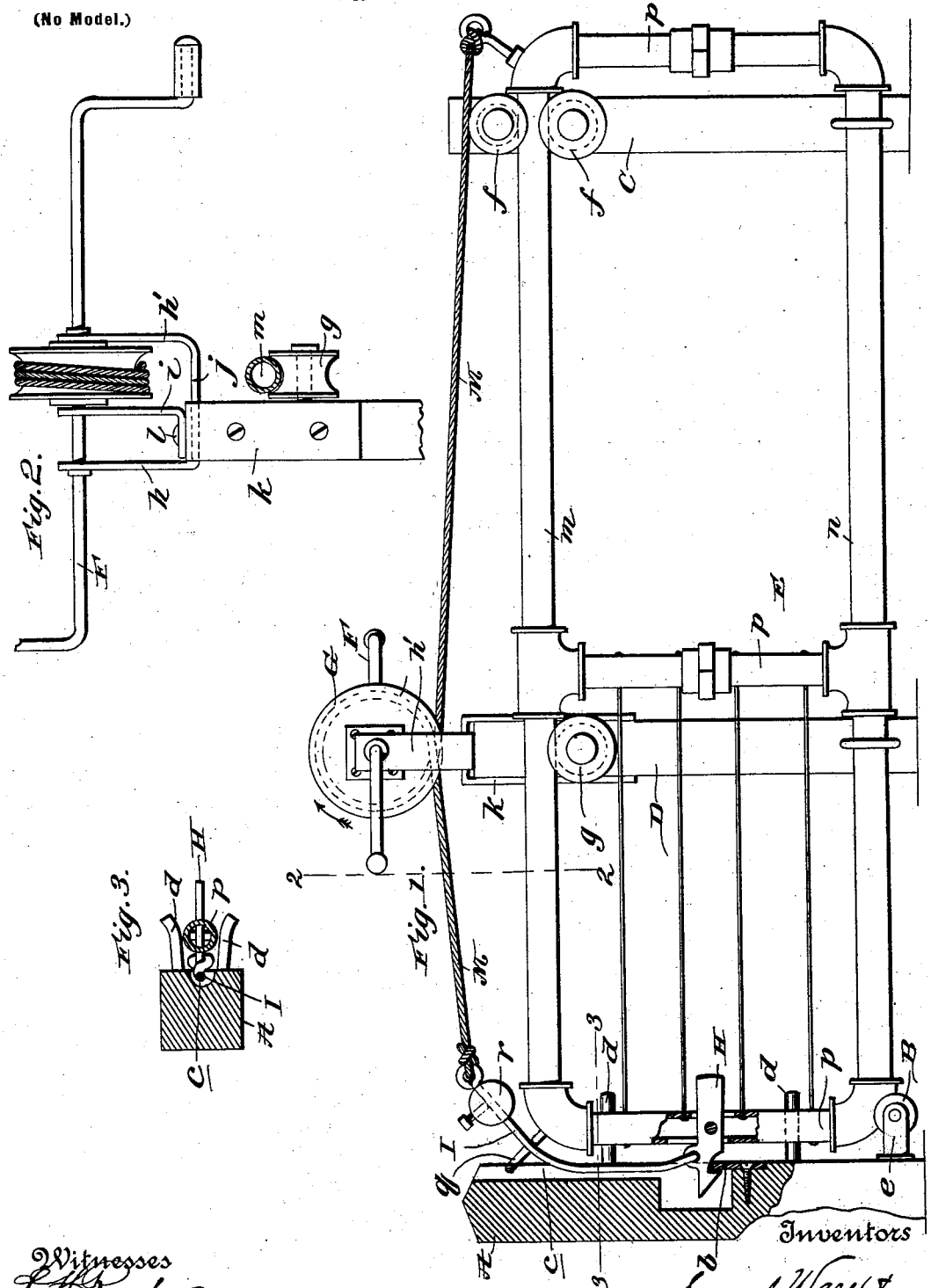
Witnesses
Inventors
Samuel Ware &
John T. Trent,
by James J. Sheehy Attorney

UNITED STATES PATENT OFFICE.

SAMUEL WARE AND JOHN T. TRENT, OF ASOTIN, WASHINGTON.

SLIDING GATE.

SPECIFICATION forming part of Letters Patent No. 689,767, dated December 24, 1901.

Application filed October 22, 1901. Serial No. 79,601. (No model.)

*To all whom it may concern:*

Be it known that we, SAMUEL WARE and JOHN T. TRENT, citizens of the United States, residing at Asotin, in the county of Asotin and State of Washington, have invented new and useful Improvements in Sliding Gates, of which the following is a specification.

This invention relates to improvements in that class of sliding gates which are equipped with gravitating latches adapted to automatically engage keepers in fixed posts and are moved toward and from the fixed posts through the medium of drums and cables arranged to be wound on and off the drums and connected with the latches.

It consists in a certain peculiar construction the novelty, utility, and advantages of which will be fully understood from the following description and claims when taken in conjunction with the annexed drawings, in which—

Figure 1 is a view, partly in side elevation and partly in section, illustrating the improved gate as secured in its closed position; Fig. 2, a detail section taken in the plane indicated by the line 2 2 of Fig. 1, and Fig. 3 a similar view taken in the plane indicated by the line 3 3 of Fig. 1.

Similar letters of reference designate corresponding parts in all of the several views of the drawings, referring to which—

A is the keeper-post of the improvements, which is provided in its inner side with a keeper $b$ and a vertical groove $c$ and on said side with upper and lower pairs of diverging arms $d$.

B is a roller mounted in a bracket $e$, connected to the lower portion of the post A; C, a fixed post provided with antifriction-rollers $f$; D, a fixed post arranged intermediate of the posts A and C and provided with an antifriction-roller $g$, and E a sliding gate supported by the posts C D. In addition to the roller $g$ the intermediate post D is provided with metallic standards $h$, $h'$, and $i$, in which is journaled a crank-shaft F, carrying a circumferentially-grooved drum G. The standards $h$ $h'$ in the preferred embodiment of the invention are joined by a transverse bar $j$, interposed between the post and a strap $k$, straddling the upper end of the post, and said bar $j$, together with the strap $k$ and the standard $i$, are connected to the post by a common pin $l$, all as best shown in Fig. 2.

The gate E is shown as composed of gas-pipe, but may obviously be formed of any other suitable material without departing from the scope of the present invention. It comprises an upper longitudinal bar $m$, arranged to slide between the rollers $f$ and on the roller $g$, a lower longitudinal bar $n$, and upright bars $p$, and is equipped at its forward end with a gravitating latch H, arranged to automatically engage the keeper $b$, and a rod I, which is loosely connected to the latch and extends upwardly therefrom and thence rearwardly through a guide-loop $q$ on the forward upper portion of the gate and is provided with a weight $r$. Said loop $q$, in addition to guiding the rod I in its vertical movements, serves to hold the rod to the forward end of the gate—*i. e.*, prevents the rod from falling away from said end of the gate. To the upper end of the rod I and also to the rear upper portion of the gate is connected a cable M, which is wound around the drum G, as shown.

In the practical operation of the improvements when the gate is open and it is desired to close and secure the same a person standing at either side of the gate turns the crank-shaft F, and consequently the drum G, in the direction indicated by the arrow. When this is done, the portion of the cable at the right of the drum will be wound thereon and the gate will be moved endwise toward the keeper-post. At the same time the cable will be paid off the drum toward the left, so that when the latch reaches the keeper it will be free to ride over and drop into engagement with the same, and thereby securely fasten the gate in its closed position. The weighted rod I obviously insures the latch dropping into engagement with the keeper and prevents casual disengagement of the latch from the keeper; but it has for its chief purpose to enter the vertical groove $c$ of the keeper-post when the gate is closed, this with a view of removing strain from and preventing bending or springing of the latch when the gate is subjected to lateral pressure, as by the wind. The pairs of diverging arms $d$ serve, incident to the closing of the gate, to guide the latch into engagement with the keeper and the vertical portion of the rod I into the groove c, while the roller B, upon which the gate rides as it is closed, removes the weight of the forward portion of the gate from the latch, and thereby materially prolongs the usefulness of the latter.

To open the improved gate, the drum G is rotated in the direction opposite to that indicated by the arrow, when through the medium of the cable and the rod I the latch will be disengaged from the keeper and the gate moved toward the right.

It will be appreciated from the foregoing that my improved gate is very simple and embodies no parts that are liable to get out of order after a short period of use, also that the operations of opening and closing the gate may be conveniently performed and with but a minimum amount of effort.

Having described our invention, what we claim, and desire to secure by Letters Patent, is—

1. The combination of a post having a keeper, a gate mounted on a suitable support, and arranged to slide toward and from the keeper-post, a gravitating latch carried by the gate and arranged to engage the keeper, a guide at the upper forward corner of the gate, a rod connected to the latch and extending upwardly through said guide and thence rearwardly, a drum mounted on the gate-support, and a cable connected to the upper end of the said rod and the rear portion of the gate, and wound on the drum.

2. The combination of a post having a keeper, a roller mounted in a bracket connected to the lower portion of the post, and disposed at the inner side thereof, a gate mounted on a suitable support, and slidable toward and from the keeper-post; said gate having its lower forward corner rounded, whereby it is adapted to slide upon the said roller, a gravitating latch carried by the gate and arranged to engage the keeper, a guide at the upper forward corner of the gate, a rod connected to the latch and extending upwardly through said guide and thence rearwardly, a drum mounted on the gate-support, and a cable connected to the upper end of said rod and the rear portion of the gate, and wound on the drum.

3. The combination of a post having a keeper at its inner side and also having a vertical groove c in said side above the keeper, diverging arms d on the inner side of the post, a gate mounted on a suitable support and arranged to slide toward and from the keeper-post, a gravitating latch carried by the gate and arranged to engage the keeper, a guide on the upper, forward corner of the gate, a rod connected to and extending upwardly from the latch, and having the lower vertical portion arranged to enter the groove c of the keeper-post, and the upper curved portion extending rearwardly through the guide on the gate, a drum mounted on the gate-support, and a cable connected to the upper end of the rod and the rear portion of the gate, and wound on the drum.

4. The combination of a post having a keeper at its inner side and also having a vertical groove c in said side above the keeper, diverging arms d on said post, a roller mounted in a bracket connected to the lower portion of the post and disposed at the inner side thereof, a gate mounted on a suitable support, and arranged to slide toward and from the keeper-post; said gate having its forward, lower corner rounded, a gravitating latch carried by the gate and arranged to engage the keeper, a guide arranged on the upper forward corner of the gate, a rod connected to and disposed above the latch and in advance of the gate and having the lower vertical portion arranged to enter the groove c of the keeper-post and the upper curved portion extending through the guide, a drum mounted on the gate-support, and a cable connected to the rod and the rear portion of the gate and wound on the drum.

In testimony whereof we have hereunto set our hands in presence of two subscribing witnesses.

SAMUEL WARE.
JOHN T. TRENT.

Witnesses:
MILLARD T. JOHNSON,
WALTER BROOKS.